Aug. 17, 1965     C. S. ASKEW     3,201,746
TEST PROBE WITH GRAPPLER
Filed July 31, 1963
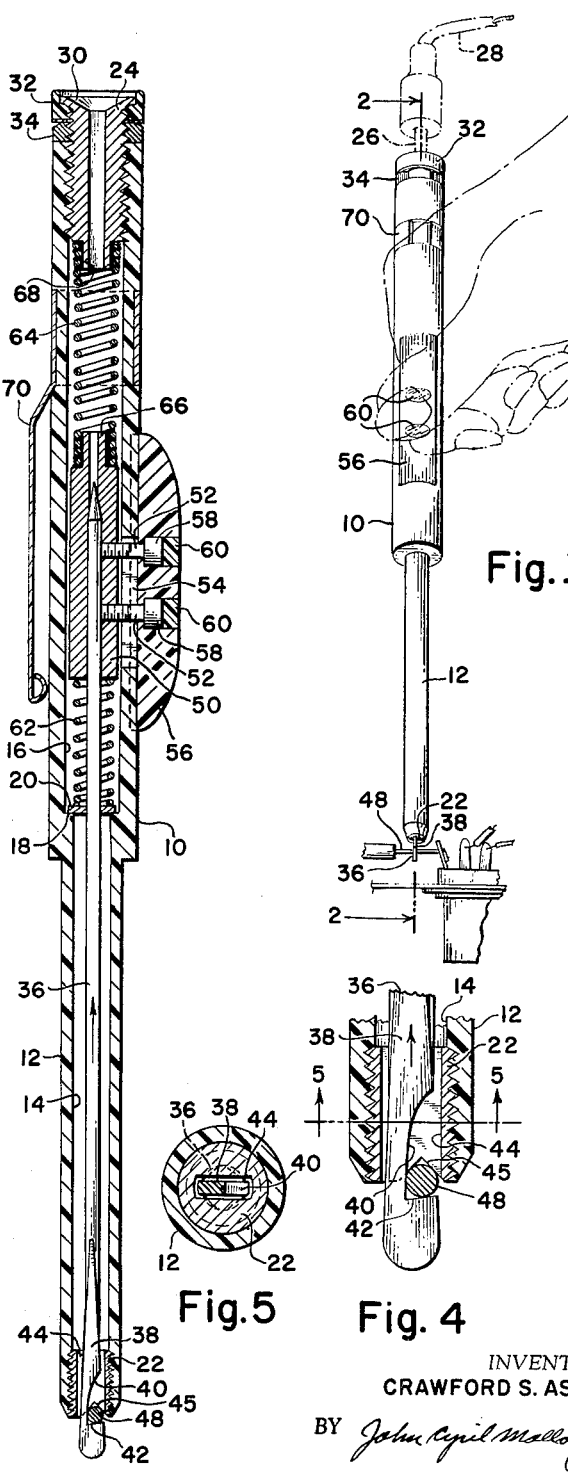
INVENTOR.
CRAWFORD S. ASKEW
BY John Cyril Malloy
ATTORNEY

United States Patent Office 3,201,746
Patented Aug. 17, 1965

3,201,746
TEST PROBE WITH GRAPPLER
Crawford S. Askew, 5120 SW. 98th Ave. Road,
Miami, Fla.
Filed July 31, 1963, Ser. No. 299,020
6 Claims. (Cl. 339—108)

This invention relates to test probes, of the type adapted for repeated, temporary contacts, for testing electric circuits, particularly in systems of complicated circuitry, such as radio and television sets, and relates, in particular, to a test probe having grappling features, for establishing a more-or-less self-sustaining contact with a lead.

Devices of this general nature have ben proposed heretofore, but these have not found favor or general acceptance, due possibly to certain serious shortcomings, and it is a general object of the present invention to provide a device in which such shortcomings are avoided.

In somewhat greater particular, certain other objects of the invention are as follows:

One object is to improve electrical contact.

Another object is to render the grappling feature more certain, and efficient.

Yet another object is to provide a probe which is more readily manipulable by the hand, and more specifically it is an object to provide a probe in which the test lead to the probe is introduced axially, so that the probe may be hand-grasped after the manner of a writing implement, or scribers of other sorts. A still further, and related object is to provide a probe with an axially movable grappling element having an actuating button located on the side of the probe the said element being connected to a terminal on the probe through extensible conductor means in the probe.

A further object is to avoid rotation of the grappling plunger.

These and other objects, which will be apparent, are attained by the present invention, a preferred form of which is described in the following specification, as illustrated in the drawing, in which:

FIGURE 1 is a perspective view of a grappling probe, constructed according to the invention, and showing a grappling operation, with the hand of the operator and the lead-in jack shown in phantom, FIGURE 2 is an axial, sectional view through the probe, with the grappling hook extended, against the residual, spring pressure, FIGURE 3 is a view similar to FIGURE 2 showing the grappling hook retracted into clamping relation on a lead wire, FIGURE 4 is a fragmentary view of the lower end of the probe shown in FIGURE 3, enlarged as to scale, and FIGURE 5 is a transverse sectional view, taken on the plane of the line 5—5 of FIGURE 4.

Referring to the drawings by characters of reference there is shown a probe of the general order of size and proportions of, and general shape of, an ordinary pen or pencil, and comprising an outer, tubular shell 10, of suitable plastic or other electrically insulating material, preferably having a reduced, lower, end half 12, for reasons related to manipulation in tight places, and with proper selectivity among wire mazes.

Internally, the lower end of the tube has a main bore 14, extending slightly above the upper limit of reduced end 12, the upper half of tube 10 being provided with a counterbore 16, defining with bore 14 a shoulder 18, receiving a washer 20. At its lower end, bore 14 is threaded to receive a brass nipple 22, to be referred to in more detail hereinafter, and at its upper end, counterbore 16 is threaded to receive a brass nipple 24, of tubular form, constituting the female component cooperating with a banana jack 26 (FIG. 1) connected to a test circuit lead 28. The female component 24 has a conical mouth 30, surrounded by a mating, plastic, covering sleeve 32, which latter is secured in place by a hex nut 34.

The probe needle 36, of brass, or other electrically conducting material, is long and slender, and round in cross section, for the greater portion of its length, and is arranged for reciprocating, sliding movement within the central bores in the probe. In this movement the lower end of the probe needle 36 extends at all times from the lower end of the probe sleeve, that is, from nipple 22, and at its lower end, the needle is flattened into a wedge-form terminal region 38, which functions as a grappling hook by virtue of a slot having a curvate side 40, and a flat bottom 42, the latter making an angle which is almost perpendicular to the longitudinal extent or, axis of the needle, but which is slightly re-entrant, that is, descending in an inward direction. To receive the needle for limited sliding movement, and also preventing its rotation about its axis, the nipple 22 is preferably provided with a through passage 44, which is rectangular in cross section, suited to only that much of flat portion 38 which is intended to slide within the nipple. As seen in FIGURE 5, the upper parts of the needle flats 38, and the normal round section of the needle are thicker than the width of passage 44, and therefore constitute a stop means, limiting sliding movement of the needle, downward through the nipple.

For cooperative action with the hook slot, the lower end of nipple 22 is provided with a pair of diametrically oppositely disposed, lower edge slots 45, which descend into engaging relation with a circuit wire 48 after the latter has been engaged by the hook. It will be seen that by virtue of the rectangular form of the slide passage 44, the slots remain in proper orientation for cooperative action with the needle hook.

The upper end of needle 36 is secured in a brass sleeve 50, which serves both to communicate the thrust for sliding movement of needle 36, and to conduct the test current to the jack component 24. For the former function, the sleeve 50 is provided with a pair of radially extending, threaded bores, receiving a pair of cap screws 52, adapted to engage needle 36, and thus secure it to the sleeve 50 for sliding movement therewith. Screws 52 also pass through a longitudinal slot 54 in tube 10, and through suitable bores in an external, operating button 56, the heads 58 of the screws being received in suitable counterbores, and the latter being preferably sealed off by an insulating plug or filler 60. The ends of the slot 54 provide limits for the sliding movement of the needle.

The sleeve 50, carrying the needle 36, is constantly biased upwardly by means of a compression, coil spring, 62, circumposed on the needle, with its lower end abutting washer 20, and its upper end abutting the lower edge of sleeve 50.

Current is carried from wire 48 through needle 36 and sleeve 50, and from thence to jack sleeve 24 by means of a coil spring 64. It should be understood that this spring has no load function, and therefore offers no sensible opposition to spring 62, since it is merely an electric lead, and constitutes no more than a pigtail device designed to compensate for movements of adjustment without disturbance to an electrical connection. For permanence of such connection, the ends of coil 64 are soldered to their associated parts, for which purpose sleeve 50 has a reduced, upper end 66, receiving a number of contacting convolutions of the helix, and jack sleeve 24 has a reduced, lower end 68, similarly receiving compacted convolutions of the helix.

By virtue of the plug-in jack, the probe is easily disconnected from a system for service elsewhere, and may be conveniently carried about in a pocket of the clothing of the user. To this end, the tube may be provided with a conventional holding clip 70.

A device constructed along the general lines illustrated in the above-described, specific embodiment will be found to attain the objects enumerated hereinabove. The provision of the operating button laterally of the housing tube enables handling in the familiar and efficient manner peculiar to writing implements, wherein the tube is conveniently grasped by the thumb and first two fingers, with the thumb performing the additional duty of actuating the button for sliding the grappling hook. Also, by virtue of this same structural arrangement, the test circuit lead can be located at the upper end of the tube, generally axially thereof, so that it is properly located for co-operation with the tool throughout a wide range of rotation thereof. This location also favors the use of standard types of jacks.

The hook and V notches shown also result in improved contact at the test point, with a four-point tangential contact, as compared, for instance with a curvate hook opposed to a flat surface. In addition, the notches provide a positive lodgment for the contacted circuit wire, whereby the operator may relax vigilance over one contact, and devote his full attention to touch probing with the other probe. Additionally, the notches prevent rotation of the probe, thus avoiding injury to the chain of electrical connections running axially of the tube.

While a certain, preferred embodiment has been shown and described, various modifications will be apparent, in the light of this disclosure, and the invention should not, therefore, be deemed as limited, except insofar as shall appear from the spirit and scope of the appended claims.

I claim:

1. A grappling probe for testing electrical circuits, comprising a tubular housing, of electrically insulating material, a shaft having a first end and a second end of electrically conducting material longitudinally reciprocable in said housing, a hook portion on said first end of said shaft, means limiting sliding movement of said shaft to positions wherein said hook portion is at all times exterior to said housing, and said second end is at all times within the housing, said hook portion being movable from a position in close association with an end of said housing to a position removed therefrom with any point on the hook at all times being an equal distance from every point of the housing, spring means in said housing, biasing said hook portion to the former position, an electrical terminal at the other end of said housing having an opening to receive a lead from test equipment, resilient conductor means connecting said shaft and said terminal, and adapted to maintain electrical connection there-between at all positions of sliding adjustment of said shaft, operating means for sliding said shaft, located exteriorly and laterally of said housing, and connected to said shaft through an opening in the side of said housing, and a conductor sleeve in said housing, said shaft mounted in said sleeve and in electrical contact therewith, said conductor means electrically connected to said sleeve, and said operating means connected to said shaft through said sleeve to transmit forces to the shaft for movement of translation of the shaft.

2. In a device as set forth in claim 1, said conductor sleeve in said housing, carrying said shaft at one end having a reduced portion at the other end, said terminal comprising a jack sleeve with a reduced inner end, and said conductor means comprising a coil spring with opposite ends circumposed on said reduced ends.

3. A device as in claim 2, said operating means comprising a button, secured to said conductor sleeve.

4. A probe comprising a tubular housing of electrically insulating material with a reciprocable and rigid conductor having a hook end exteriorly of one end of said housing with the other end of the conductor in the housing, operating means for said conductor located exteriorly of the housing and connected to said conductor through a lateral opening in the housing to move the hook end of the conductor between a first extended position and a second retracted postion in close association with an end of said housing, the other end of the conductor being in the housing at all times on movement of the conductor between the first and the second position, an electrical terminal carried at the other end of said housing to adapt the probe for receiving an electrical lead from test equipment, and extensible conductor means in the housing intermediate the conductor and the terminal to communicate current therebetween, and, upon movement of the conductor with respect to the ends of said housing, the ends of said housing being at all times an equal displacement distance with respect to the hook end.

5. A grappling hook for testing electrical circuits comprising; a tubular housing of electrically insulating material; a shaft of electrically conductive material longitudinally reciprocal in the housing with respect to the ends of the housing, one end of the shaft being of hook form to engage a wire to be tested exterior of the housing; operator means exteriorly of the housing and connected to the shaft through a lateral opening in the housing to move the hook end between an extended position to engage a wire to be tested, and a retracted position in close association with an end of the housing; means to limit movement of the shaft with respect to the housing so that in normal operation of the probe the other end of the shaft is at all times in the housing; an electrical terminal at a station in the other end of the housing for electrical connection with a test lead; and conductor means in the housing to communicate electrical current between the terminal and the shaft and to permit relative movement of the hook end between the positions such that during movement any point on the hook end is at all times an equal distance of displacement with respect to the ends of the housing for electrical test of the wire.

6. A probe comprising a hollow cylindrical housing of electrically insulating material with a reciprocal and rigid conductor having a hook and exteriorly of one end of said housing with the other end of said conductor in the housing, operating means for said conductor located exteriorly of the housing and connected to said conductor through a lateral opening in the housing to move the hook end of the conductor an equal distance relative to all points of the housing between a first extended position and a second retracted position in close association with an end of said housing, the other end of the conductor being in the housing at all times on movement of the conductor between the first and the second position, an electrical terminal carried at the other end of said housing to adapt the probe for receiving an electrical lead from test equipment, conductor means in the housing intermediate the conductor and the terminal to communicate current between the conductor and the shaft in the retracted position to test a wire electrically, and guide means carried by the housing to limit the shaft to movement of translation only in the housing.

References Cited by the Examiner

UNITED STATES PATENTS

| 2,516,657 | 7/50 | Spendlove | 339—108 X |
| 2,529,270 | 11/50 | Webster | 339—108 X |
| 2,675,528 | 4/54 | LaPoint | 339—108 X |
| 2,677,117 | 4/54 | Swain | 339—108 X |
| 2,714,196 | 7/55 | Melehan | 339—108 X |
| 2,769,155 | 10/56 | Wimble | 339—108 |
| 3,072,877 | 1/63 | Landwehr | 339—108 |

FOREIGN PATENTS 748,811 5/56 Great Britain.

JOSEPH D. SEERS, *Primary Examiner.*

ALBERT H. KAMPE, *Examiner.*